United States Patent Office 3,307,953
Patented Mar. 7, 1967

3,307,953
VISCOUS CHOCOLATE FLAVORING COMPOSITION AND PROCESS OF MAKING SAME
Barton Heard Siebers, Fulton, N.Y., assignor to Afico S.A., Lausanne, Switzerland, a corporation of Switzerland
No Drawing. Filed June 21, 1965, Ser. No. 466,516
17 Claims. (Cl. 99—23)

This application is a continuation-in-part of my copending application Serial No. 340,540, filed January 27, 1964, now abandoned.

This invention relates to novel compositions useful in the flavoring of foods and to process of preparing such compositions. The invention relates in particular to a chocolate flavoring composition for foodstuffs which is simple and convenient to use, and to the method of its preparation.

One of the products most used as a source of chocolate flavoring is "cooking chocolate," or "chocolate, chocolate liquor" as defined in the Standards for Chocolate and Cocoa Products established under the Federal Food, Drug and Cosmetic Act. This material, as used in the home or in industry, is at room temperature in a naturally hard, solid state and does not lend itself to ready admixing with other ingredients in recipes which are prepared at room temperature, such as cake batter. The solid chocolate must be either grated fine or heated and melted in a separate container. This usually entails not only the use and soiling of additional equipment, but a loss in time as well as in product, considering that which remains in the melting vessel.

It is an object of the present invention to provide a chocolate flavoring in a flowable or soft plastic form so that it will readily disperse in a batter or food recipe at ordinary room temperatures without requiring separate preparation such as pre-warming or melting.

Another object of the invention is to provide a chocolate flavoring those flavor quality when used in cooking and baking is at least equal to that of the majority of the commercially available cooking chocolates presently on the market, yet does not require the use of a large proportion of the relatively expensive fat portion of the cocoa bean, i.e., cocoa butter, which can more profitably be employed elsewhere.

Another object of the invention is to improve the accuracy and proportioning of chocolate flavoring in food recipes by providing a flowable product which may be added directly to the mix in pre-measured amounts.

Another object is to provide a flowable or soft plastic chocolate flavoring composition of essentially the same flavor strength as cooking chocolate so that the two may be used interchangeably in recipes.

A still further object of this invention is to provide a chocolate flavoring composition which will remain flowable over the usual storage temperature found in the home, e.g., from about 65° to about 80° F., yet remain physically stable and homogeneous, without substantial separation of liquid or solid phase.

Yet another object is to provide a process for preparation of the described compositions.

These and other objects will be apparent from the following description of the invention.

I have found in accordance with the present invention that by intimately admixing cocoa powder in suitable proportion with an edible fat or blend of edible fats that is at room temperature predominantly liquid but has a small component which is in the solid phase, the resulting product fulfills all the flavoring requirements of cooking chocolate, yet is in a free-flowing, easy to use, readily miscible homogeneous state without prior treatment such as heating or melting.

The product obtained by mixing cocoa with an edible fat which is completely liquid at room temperature, or the temperature range at which it will be used, transported, etc., is unstable in that an oil fraction tends to separate with passage of time, impairing the flowability of the mixture. This tendency is more marked at elevated temperature. I have found, however, that cocoa dispersed in an edible fat or blend of edible fats having a small component which is normally solid provides a stable product from which a substantial oil phase does not separate. More particularly, I have found that cocoa powder in admixture with a fat having a Solid Fat Index over the temperature range at which the product is to be used of at least 0.1, and preferably at least 0.2 (as measured by the American Oil Chemists' Society Tentative Method Cd 10–57, revised 1960, corrected 1961, for determining Solid Fat Index) provides, when tempered as hereinafter discussed, a stable composition which is not subject to separation of a substantial oil phase. I consider the product to be stable if after storage at an elevated temperature substantial oil separation does not occur; more particularly, the product is considered stable if a 1 ounce specimen held at 83° F. for two weeks does not show separation of more than 5 drops (0.6 weight percent) of clear oil.

Thus in accordance with the present invention a stable chocolate flavoring composition is provided which comprises cocoa powder in admixture with an edible fat or blend of edible fats having a Solid Fat Index of at least about 0.1 at 70° F., the composition further being characterized in that less than about 0.6 weight percent of oil separates after storage for two weeks at 83° F.

It is also desired that the flavoring composition be flowable and plastic at the temperature of use, and I have found that this may be accomplished by employment of a fat or blend of fats which has a Solid Fat Index at room temperature of about 17.5 or less. Accordingly, the composition of this invention includes cocoa powder in admixture with a fat or blend of fats having a Solid Fat Index between about 0.1 and about 17.5 at 70° F.

It is also desirable that the product of the invention have a Solid Fat Index of at least about 0.1 measured at 80° F., preferably 0.2 or more. Certain uses or transportation conditions may involve exposure to temperatures greater than 80° F. One skilled in the art in view of the teaching herein can readily select an edible fat ingredient having an appropriate Solid Fat Index so that oil separation from the composition does not occur at the upper end of the temperature range and the product remains flowable at the temperature of use.

It is to be observed that the Solid Fat Index values given above apply to the fat portion of the product and are not measured on the cocoa-containing product itself. As known in the art, fat may be removed from chocolate products by pressing (usually hydraulically) or by solvent extraction. As will appear below, the cocoa ingredient of the product of this invention contains some fat; nevertheless, Solid Fat Index determinations on fat removed from the product by pressing or by solvent extraction are generally comparable, although not necessarily identical, to those obtained on the fat ingredient with which the cocoa powder is mixed.

The proportion of cocoa may be varied to provide a product of appropriate flavor, strength and acceptable physical properties. Generally, about 35% to about 65% cocoa powder is satisfactory, about 55% to about 65% being preferred. The balance of the composition comprises the edible fat or blend of fats above described, although additional ingredients such as salt, vanillin, sugar, chocolate liquor, lecithin (particularly where moisture is present in one of the ingredients), antioxidant, or other desired materials, e.g., fat emulsifiers, such as sorbitan monostearate, to improve plasticity, may be employed in minor amount for known purposes.

It is preferred to employ a medium fat cocoa (10%–22% fat) in the product of this invention. The cocoa butter comprising the fat component of the cocoa will normally not affect to any great degree the fat solids content of the product, at least when a medium fat cocoa is employed. Should a cocoa be used which has a substantially higher fat content than does medium fat cocoa, e.g., chocolate liquor, the fat solids in the product may be significantly affected. In such event, appropriate adjustment may be made in the composition of the principal fat component of the mixture.

The flowability of the product is desirably such as will permit it to slip readily from its container into the batter or other food base, while not being so liquid as to pour and splatter. It is preferred that the viscosity of the product at 70° F. not exceed about 50,000 poises and more preferably not exceed about 25,000 poises, and be at least about 2,000 poises. At 80° F. the viscosity preferably lies between about 1,000 poises and 8,000 poises. (Viscosities specified in this paragraph are determined on a Brookfield helical path Viscometer.)

The penetrability of the product (determined by ASTM Method D–217–60, results reported in tenths of a millimeter) at 70° F. is preferably from about 160 to about 400, more preferably about 200 to about 350, and at 80° F. preferably from at least about 250 to about 400 or more, more preferably about 300 to about 400.

Intimate admixture of cocoa and fat base is desirable to provide a homogeneous product. The particle size of the cocoa should be reduced, if necessary, and it should be dispersed well in the fat. To accomplish this, vigorous mechanical agitation of cocoa powder and completely melted fat may be employed, but it is preferred to use a homogenizer, treating the product preferably in two stages at 1500 and 500 pounds per square inch respectively. Alternatively, any of the many types of chocolate refiners may be used to reduce the cocoa powder particles to about 80 microns or less.

The edible fat ingredient having the Solid Fat Index described above may be prepared in any suitable manner, the following method being illustrative. An edible oil or combination of edible oils that is entirely fluid at about 60° F. is blended with a small amount of a higher melting, edible, oil-miscible material at an elevated temperature so that all constituents of the blend are completely melted. Suitable higher melting materials include normally solid fats, glycerides and equivalent materials which have a melting point in excess of the upper end of the temperature range at which it is desired that the chocolate-containing product be stable. It is preferred that the higher melting material have a melting point in excess of 90° F. Antioxidant (such as butyl hydroxy anisole) may, if desired, be added to improve the oxidative stability of the fat. The cocoa is then mechanically worked in until the mixture is smooth, while maintaining the fat component at a temperature above the melting point of the highest melting constituent. The mixture is then treated in a homogenizer or refined as previously described while the temperature is maintained at a level adequate to keep all the fat melted. The product is then tempered.

Tempering may be accomplished either in batches or continuously. The purpose of the tempering operation is to regulate the rate, size and amount of crystal formation in the product. I have found that the higher melting constitutent of the fat blend influences the product beyond its contribution to the Solid Fat Index, and believe that it affects crystal formation in the product, perhaps by acting as a seed for crystal formation.

In a batch operation, the temperature of the product may be lowered to 95° F., for example, or below until sufficient seed has been developed to increase substantially the viscosity of the product. If necessary, the temperature can then be raised somewhat—but not beyond the point where all seed is destroyed—to decrease the viscosity sufficiently to facilitate packaging, as by a liquid filling machine. A suitable packaging viscosity includes the range of 60 to 100° MacMichael (using a MacMichael Viscometer, No. 25 wire, 2 cm. bob, 20 r.p.m., 3 cm. immersion), suitable viscosity depending in part upon the packaging equipment employed. After the product is packaged (advantageously in measured amounts in plastic or foil pouches), it is allowed slowly to crystallize further by holding at a suitable temperature, preferably just below that at which seed crystals appear.

In a continuous operation, similar control of crystal formation and growth is desirable. In either method it is preferred to destroy any existing seed by first heating to a temperature sufficient to melt such seeds, cool with agitation to promote formation and growth of small crystals, decrease the viscosity by heating if necessary to a level suitable for packaging, and holding the packaged product at a temperature preferably just below that at which seed crystals appear for a period sufficient to accomplish crystallization so that the product is stable in that a substantial oil phase does not separate upon storage at an elevated temperature, viz. 2 weeks at 83° F., as hereinabove discussed. I have found that a holding period of 48 hours, preferably 72 hours at a temperature between 58°–75° F., preferably 65°–70° F., is satisfactory for this purpose. Crystallization, together with increase in viscosity, may continue at a diminished rate after the product has become stable.

It is advantageous, in a continuous process, to employ a relatively narrow elongated tube, jacketed for a cooling medium and agitated by means of vanes or blades which closely approach or scrape the inner walls of the tube. One such type of apparatus is known as a "Votator" and is described in U.S. Patent No. 1,783,864. The product for tempering is introduced into the elongated tube at a sufficiently high temperature to insure that all of the fat is in the melted state. It is then cooled rapidly (suitably is less than 5 min.) to a temperature at which onset of crystallization occurs. The product is still a free-flowing liquid and may be held for a short interval, such as 10 minutes, at this temperature while crystal growth continues, and then warmed slightly, if necessary, to improve fluidity but not so much as to destroy the seed, then filled into containers and held at a temperature permitting crystal growth to continue. If the product is sufficiently fluid, it may be packaged directly without rewarming.

Any edible oil or fat may be used in the base, including illustratively cottonseed, soybean, corn, coconut, palm or palm kernel and oleo oils as well as hydrogenated, fractionated and/or interesterified liquid variations thereof. The cocoa powder is preferably a medium fat cocoa (10 to 22% cocoa butter) and may be either dutched or undutched.

The following examples are illustrative of the invention and are not to be taken in a limiting sense. All parts are by weight except as otherwise specified.

Example 1

The following fats are blended in a jacketed kettle at a temperature of 165° F. and held for about 15 minutes at this temperature with agitation to insure complete mixing and melting:

| | Parts |
|---|---|
| Kex 500 Oil (a normally liquid hydrogenated oil produced by Durkee Famous Foods Co. from refined domestic vegetable oils) | 20.3 |
| 76° coconut oil | 20.3 |
| Sets-It Hard Fat (a solid hydrogenated vegetable oil produced by Durkee Famous Foods Co., having a capillary melting point of about 157° F. ±3°, titer of 64° C. ±2°, iodine value of 5 (max.)) | 0.35 |

To the hot fat blend is added a trace amount of BHA (butyl hydroxy anisole, an antioxidant) and 59 parts of undutched medium fat cocoa powder (containing 12.5% cocoa butter). The mixture is stirred vigorously for about half an hour until the cocoa is well dispersed and the mixture is smooth and uniform, while cooling the mixture to a temperature no lower than about 120° F.

The mixture is then tempered. It is first heated, if necessary, to about 140° F. to insure complete melting of all fat components, and is then cooled under controlled conditions to cause onset of crystal formation and growth. I prefer to cool the mixture to about 73–74° F. by means of a heat exchanger (APV plate and frame type continuous exchanger) employing cooling water no colder than 70° F., in order to avoid excessive chilling and formation of a rind which would block the passages. I also prefer a cooling rate of about 20° to about 24° F. per minute, and an overall heat transfer coefficient of about 10.2 B.t.u. per hour per sq. ft. per degree F.

The viscosity of the cooled mixture is constantly increasing, due to crystal growth, and may double within about 10 minutes after leaving the cooling side of the heat exchanger. Packaging is desirably accomplished within this time, and the mixture may be warmed if it is desired to decrease the viscosity. A suitable viscosity as the product emerges from the cooling side of the heat exchanger is between about 50 and about 160 poises (Brookfield RVT Viscometer, 20 r.p.m., #5 spindle) a preferred viscosity range being about 76 to about 96 poises. Products having discharge viscosities outside the range of about 50 to about 160 poises tend to be less stable.

After packaging (preferably at a viscosity no greater than about 350 poises (Brookfield, 20 r.p.m., #5 spindle)), the product is held at a temperature of about 65° to about 70° F. for 2–3 days to permit crystallization to continue.

After several weeks' storage at about 75° F., the product has the following illustrative characteristics:

PENETROMETRY
[ASTM Method D-217-60, tenths of a mm.]

| 70° F. | 75° F. | 80° F. |
|---|---|---|
| 261 | 334 | 351 |

VISCOSITY
[Brookfield, T-C spindle, 5 r.p.m., poises]

| 70° F. | 75° F. | 80° F. |
|---|---|---|
| 12,150 | 4,020 | 3,265 |

SOLID FAT INDEX
[AOCS Tent. Method Cd 10-57, rev. 1960, corr. 1961]

| | 50° F. | 59° F. | 70° F. | 80° F. | 92° F. |
|---|---|---|---|---|---|
| Fat hydraulically pressed from product of Example 1 | 32.2 | 16.4 | 1.2 | 0.8 | 0.3 |
| Fat component before cocoa added | 29.1 | 17.2 | 1.5 | 1.2 | 0.7 |

Samples of the packaged product (each containing 1 ounce) are stored at 83° F. for 2 weeks. The packages are opened and it is found that no oil has separated.

Example 2

The following fats are blended in a jacketed kettle, heated to 130° F. and held at this temperature for two minutes.

| | Parts |
|---|---|
| Kex 500 Oil | 12.5 |
| 76° coconut oil | 15.5 |
| All Purpose Shortening (A hydrogenated fat produced from soybean and cottonseed oils by Lever Brothers, Inc.) | 11.0 |
| | 39.0 |

To the above is added 0.020 part Tenox IV antioxidant (BHA and BHT, Tennessee Eastman Company). Sixty-one parts cocoa powder, not dutched, of about 13 to 14% cocoa fat content is added and mixed about thirty minutes until smooth, while cooling the entire mass to 120° F.

The mass is then treated in a valve-and-piston type two-stage homogenizer at 1500 p.s.i. on the first stage, 500 p.s.i. on the second stage. The mass is tempered by cooling to 90° F. in a jacketed kettle, rewarmed to 97° F., filled into pouches at one ounce net each, packed into cases, and held at 75 to 85° F. for three days to complete the crystallization process.

The fat blend of this example has the following physical characteristics:

| | Added Fat Blend | Cocoa Butter (for comparison) |
|---|---|---|
| Melting point, °F | 95 | 93.2 |
| Softening point, °F | 81.5 | 89.6 |
| Solidification point, °F | 65.6 | 79.7 |

Solid Fat Index measurements are as follows:

| Temperature, °F. | Solid Fat Index | |
|---|---|---|
| | Added Fat Blend | Fat Pressed from Finished Product |
| 50.0 | 29.9 | 31.2 |
| 59.0 | 17.5 | 17.7 |
| 69.8 | 5.2 | 4.5 |
| 79.7 | 3.9 | 3.4 |
| 91.9 | 1.8 | 1.7 |
| 101.0 | 0.3 | 0.8 |

One-ounce samples of the product after storage for two weeks at 83° F. show no separation of oil.

Example 3

The following fats are blended in a jacketed kettle, heated to 150°–160° F. and held at this temperature for about 2 to 5 minutes.

| | Parts |
|---|---|
| Kex 500 Oil | 20.4 |
| 76° coconut oil | 20.4 |
| Cote-Hi 000 (A fully hydrogenated palm kernel fat having a melting point of about 140° F. from Crok & Laan Co.) | 0.2 |
| | 41.0 |

Fifty-nine parts of undutched coca powder, finely ground and containing 13 to 14% cocoa fat is added and mechanically mixed into the fat for about thirty minutes or until smooth, while cooling the batch to 120° F.

The mass is then refined on a heavy duty roller-type chocolate refiner to a maximum particle size of 75 microns while maintaining the temperature at about 120° F. Following refining, the mass is tempered by cooling in a Votator from 120° F. to 80° to 85° F. while agitating, then machine-filled directly into one-ounce pouches by a Bartelt liquid filler, sealed, cased, and held at 60° to 70° F. for three days to complete the crystallization process.

Solid Fat Index measurements on the fat blend employed in Example 3 are comparable to those of Example 2 at temperatures of from 10°–15° F. less. Thus a Solid Fat Index of 1.7 on the fat of Example 3 is obtained at about 78° F., and an Index of 31 is obtained at about 35° F. The fat of Example 3 has a melting point of 88° F., softening point of 75° F. and solidification point of 55° F.

No oil separation is observed when the product of Example 3 is stored for two weeks at 83° F.

*Example 4*

The procedure of Example 1 is repeated employing the same ingredients in the same proportions, with the exception that 0.30 part of Sets-It Hard Fat is employed.

After several weeks storage at about 75° F., the product has the following Solid Fat Index measurements:

| | 50° F. | 59° F. | 70° F. | 80° F. | 92° F. |
|---|---|---|---|---|---|
| Fat solvent extracted from product of Example 4 | 29.5 | 15.3 | 0.5 | 0.2 | 0.0 |

Upon opening a 1 oz. package of the product of this example after storage at 83° F. for two weeks, it is found that about 2 drops of oil (0.24 wt. percent) have separated. This slight degree of separation does not impair the usefulness of the stored sample.

The products of each of the examples are high quality chocolate flavoring compositions and prove excellent for use in baking a variety of foods, including cakes, fudges, brownies, icings, etc. The compositions are flowable over the range 65°–80° F. and at temperatures extending on either side of that range. It is especially advantageous and convenient to package the composition in individual envelopes in amounts equivalent to one ounce of chocolate liquor or multiples thereof. In this form, an envelope or envelopes, as required, may be opened and the contents squeezed or permitted to flow into the food mix. Melting and measuring are avoided, and the flavoring mixes readily and easily into batters and the like.

I claim:

1. A viscous chocolate flavoring composition flowable over the temperature range 65°–80° F., comprising about 35% to about 65% cocoa powder and about 65% to about 35% of a member selected from the group consisting of edible fats and blends of edible fats, said member having a Solid Fat Index of at least about 0.1 at 70° F., said composition being characterized by freedom from separation of a substantial oil phase after storage for two weeks at 83° F.

2. A composition according to claim 1 characterized in that said member has a Solid Fat Index between about 0.2 and about 17.5 at 70° F. and in that the composition has a viscosity at 70° F. between about 2,000 and about 50,000 poises.

3. A composition according to claim 2 characterized in that said member consists of a blend of normally liquid fat with normally solid fat having a melting point in excess of about 90° F.

4. A composition according to claim 2 characterized in that the composition has a viscosity at 80° F. between about 1,000 and about 8,000 poises.

5. A composition according to claim 4 characterized in that less than about 0.6 weight percent of oil separates from the composition after two weeks' storage at 83° F.

6. A viscous chocolate flavoring composition flowable over the temperature range 65°–80° F., comprising about 55% to about 65% finely divided medium fat cocoa powder and about 45% to about 35% of a member selected from the group consisting of edible fats and blends of edible fats, said member having a Solid Fat Index at 70° F. between about 0.2 and about 17.5 and a Solid Fat Index at 80° F. of at least about 0.2, said composition being characterized in having a viscosity of 70° F. between about 2,000 and about 25,000 poises and a viscosity at 80° F. between about 1,000 poises and about 8,000 poises, a penetrability at 70° F. between about 16 and about 40 mm., said composition being further characterized in that less than about 0.6 weight percent of oil separates from the composition after two weeks' storage at 83° F.

7. A composition acording to claim 6, characterized in having a penetrability at 70° F. between about 20 and about 35 mm. and a penetrability at 80° F. of at least about 25 mm.

8. A viscous chocolate flavoring composition flowable over the temperature range 65°–80° F., comprising about 59 parts finely divided medium fat cocoa powder and about 41 parts of a blend of edible fats, said blend consisting of about 0.35 part of a fat having a capillary melting point of about 157° F. and about 40.6 parts of normally liquid fat, said blend having a Solid Fat Index of at least about 0.1 at 70° F. and at 80° F., said composition being characterized in that less than about 0.6 weight percent of oil separates from the composition after two weeks' storage at 83° F.

9. A process for making a viscous chocolate flavoring composition flowable over the temperature range 65°–80° F., which comprises intimately admixing about 35% to about 65% cocoa powder with about 65% to about 35% edible fat blend having a Solid Fat Index at 70° F. between about 0.1 and about 17.5, at a temperature at which said fat blend is completely molten, cooling the mixture to a temperature at which crystal formation occurs and maintaining the mixture at a temperature at which crystal growth continues for a period of time sufficient to crystallize the mixture to an extent that a substantial oil phase does not separate therefrom after two weeks' storage at 83° F.

10. A process for preparing a viscous chocolate flavoring composition flowable over the temperature range 65°–80° F., which comprises intimately admixing about 55% to about 65% of finely divided cocoa powder with about 45% to about 35% of a blend of edible fats having a Solid Fat Index at 70° F. between about 0.1 and about 17.5 while maintaining the mixture at a temperature at which all components of the fat blend are molten, cooling the mixture until its viscosity increases to between about 50 and about 160 poises (Brookfield, #5 spindle, 20 r.p.m.), and maintaining the mixture at a temperature at which the viscosity continues to increase for a period of time sufficient to stabilize the mixture in that a substantial oil phase does not separate therefrom after two weeks' storage at 83° F.

11. A process for preparing a viscous chocolate flavoring composition flowable over the temperature range 65°–80° F., which comprises intimately admixing about 55% to about 65% of finely divided cocoa powder with about 45% to about 35% of a blend of edible fats having a Solid Fat Index at 70° F. between about 0.1 and about 17.5 while maintaining the mixture at a temperature at which all components of the fat blend are molten, cooling the mixture to about 73° to about 74° F., and maintaining the cooled mixture to about 65° to about 70° F. for a period of two to three days.

12. A process according to claim 11 wherein the mixture is cooled to about 73° to about 74° F. at a cooling rate of about 20° to about 24° F. per minute.

13. A process for preparing a viscous chocolate flavoring composition flowable over the temperature range 65°–80° F., which comprises intimately admixing about 35% to about 65% cocoa powder with about 65% to about 35% of an edible blend of normally liquid fat and normally solid fat having a melting point in excess of about 90° F., said blend having a Solid Fat Index at 70° F. between about 0.1 and about 17.5, while maintaining the mixture at a temperature at which all components of the fat blend are molten, cooling the mixture until crystal formation causes an increase in its viscosity, packaging the mixture, and maintaining the packaged mixture at a temperature at which crystal growth continues for a period of time sufficient to stabilize the mixture in that a substantial oil phase does not separate therefrom after two weeks' storage at 83° F.

14. A process according to claim 13 wherein the packaged mixture is maintained at a temperature at which crystal growth continues until its viscosity is between about 2,000 and about 50,000 poises measured at 70° F. and between about 1,000 and about 8,000 poises measured at 80° F.

15. A process according to claim 13 wherein the mixture is packaged at a viscosity no greater than about 350 poises (Brookfield, #5 spindle, 20 r.p.m.).

16. A process according to claim 12 wherein the cocoa and fat blend are intimately admixed by refining.

17. A process according to claim 12 wherein the cocoa and fat blend are intimately admixed by homogenizing.

References Cited by the Examiner

UNITED STATES PATENTS

| | | | |
|---|---|---|---|
| 2,356,181 | 8/1944 | Rubens | 99—23 |
| 2,521,242 | 9/1950 | Mitchell | 99—118 |
| 2,815,285 | 12/1957 | Holman et al. | 99—118 |
| 2,815,286 | 12/1957 | Andre et al. | 99—118 |
| 2,835,592 | 5/1958 | Rusoff | 99—23 |

OTHER REFERENCES

Cook: "Chocolate Production and Use" 1963, published by Magazines for Industry, Inc., New York, pp. 174, 180, 358.

A. LOUIS MONACELL, *Primary Examiner.*

J. M. GOLIAN, S. E. HEYMAN, *Assistant Examiners.*